ated Sept. 28, 1965

3,208,907
STABILIZED SALICYLATE COMPOSITIONS
Jean-Louis A. Delarue, Paris, France, assignor to Laboratoires Toraude, Paris, France, a corporation of France
No Drawing. Filed Nov. 13, 1961, Ser. No. 152,067
3 Claims. (Cl. 167—65)

The present invention relates to the stabilization of pharmaceutical compositions containing acetyl salicylic acid or its salts in admixture with a substance capable of causing formation of unstable oxidation products and to the method of preparing such stabilized compositions wherein the acetyl salicylic acid and its salts are protected against decomposition, hydrolysis and undesirable alterations.

Acetyl salicylic acid in aqueous solution or suspension is unstable as it undergoes progressive hydrolysis with liberation of acetic acid and salicylic acid. Pure acetyl salicylic acid can be kept in the open air for many months without alteration. Similarly, in admixture with various substances of weak chemical activity, such as talc and starch, its stability at ambient temperature is practically unlimited.

In a general way, applicant has established that under fixed or definite conditions the speed of hydrolysis of acetyl salicylic acid depends closely on the oxidation potential of the medium in which it is present and that in particular various chemical substances capable of producing peroxides, such as eucalyptol or essential oil, phenolic derivatives, glyceryl esters of unsaturated fatty acids and cocoa butter, cause when in admixture with acetyl salicylic acid a partial decomposition thereof. This decomposition appears only slowly and its speed increases with the temperature of the experiment.

The present process permits avoidance of this undesirable alteration and the obtaining of compositions which are stable. The stabilization of an admixture of acetyl salicylic acid or its salts with various substances capable of forming unstable oxidation products, such as eucalyptol or essential oil, cocoa butter and ethyl guaiacyl glycolate, has been obtained according to the invention by the addition of an anti-oxidant with or without a sequestering agent. As anti-oxidants, ascorbylpalmitate, propyl gallate, butyl hydroxyanisole and the tocopherols have been successfully used. As sequestering agents, tetracemic acid and 8-hydroxyquinoline have been satisfactorily used. For example, ascorbyl palmitate and α-d, l-tocopherol have been used in the amount of 1 part to 10,000 parts, by weight, of the mixture and 8-hydroxyquinoline has been used in the amount of 1 part to 100,000 parts, by weight, of the mixture. The mixtures thus prepared, kept in closed receptacles, and protected from light, have excellent keeping qualities.

The invention thus permits the industrial production of numerous stable preparations based on acetyl salicylic acid and in particular suppositories and compressed tablets:

*Example I*

3000 grams of a synthetic suppository excipient free from peroxides, of the type eutectic mixture of glyceric esters of partially saturated fatty acids are liquefied at mild temperature. To the same are added 0.17 gram α-,l-tocopherol and 400 grams finely pulverized acetylsalicylic acid. The resulting mixture is homogenized by mechanical agitation and cooled as rapidly as possible in suitable suppository molds.

*Example II*

A liquid mixture of

| | Grams |
|---|---|
| Camphor | 80 |
| Essential oil of niaouli free of peroxide | 120 |
| α-d,l-Tocopherol | 0.17 | is slowly added to 2560 grams of cocoa butter (free of peroxide) melted at mild temperature in a separate receptacle. 400 grams of acetylsalicylic acid and 100 grams of glycocoll are then added and the resulting mixture is homogenized by mechanical agitation and cooled as rapidly as possible in suitable suppository molds.

What is claimed is:

1. A salicylate selected from the group consisting of acetyl salicylic acid and its non-toxic pharmaceutically acceptable salts in admixture with substances capable of causing formation of unstable oxidation products and into which admixture has been incorporated about 1 part to 10,000 parts by weight of the admixture of a stabilizing agent selected from the group consisting of ascorbyl palmitate, tocopherol, propyl gallate and butylhydroxyanisole.

2. A stabilized admixture according to claim 1, in which a sequestrant is incorporated in the amount of about 1 part to 100,000 parts, by weight, of the admixture.

3. A molded suppository comprising a synthetic suppository excipient in which is incorporated prior to molding and while the excipient is in liquefied condition 0.17 gram of α-d,l-tocopherol and 400 grams of finely pulverized acetyl salicylic acid.

References Cited by the Examiner

Merck Index, 7th edition, 1960 (see pages 106, 778 and 864).

Remington's Practice of Pharmacy, 1956, 11th edition (see page 1094).

United States Dispensatory, 23rd edition (see page 47).

JULIAN S. LEVITT, *Primary Examiner.*

MORRIS O. WOLK, LEWIS GOTTS, *Examiners.*